United States Patent
Kuriyama et al.

(10) Patent No.: US 12,212,383 B2
(45) Date of Patent: Jan. 28, 2025

(54) COMMUNICATION PATH PRESUMING METHOD AND WIRELESS COMMUNICATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/271,251

(22) PCT Filed: Jan. 26, 2021

(86) PCT No.: PCT/JP2021/002670
§ 371 (c)(1),
(2) Date: Jul. 7, 2023

(87) PCT Pub. No.: WO2022/162735
PCT Pub. Date: Aug. 4, 2022

(65) Prior Publication Data
US 2024/0305338 A1 Sep. 12, 2024

(51) Int. Cl.
*H04B 7/0417* (2017.01)
*H04B 7/06* (2006.01)

(52) U.S. Cl.
CPC ......... *H04B 7/0417* (2013.01); *H04B 7/0634* (2013.01)

(58) Field of Classification Search
CPC .......... H04B 7/0417; H04B 7/08; H04B 7/06; H04B 7/0413; H04B 7/0617; H04B 7/0634; H04B 7/086
See application file for complete search history.

(56) References Cited

U.S. PATENT DOCUMENTS

| | | | | |
|---|---|---|---|---|
| 2012/0252366 A1* | 10/2012 | Aoki | | H04B 7/0617 |
| | | | | 455/67.11 |
| 2013/0083865 A1* | 4/2013 | Wu | | H04B 7/0619 |
| | | | | 375/267 |

(Continued)

OTHER PUBLICATIONS

Kuriyama et al., "Wide-band Single-Carrier MIMO System Using FIR-type Transmit Beamforming and Bi-Directional Receive Equalization", Proceedings of IEICE General Conference 2019, The Institute of Electronics, Information and Communication Engineers, B-5-105, Mar. 2019, pp. 371 (2 pages including English Translation).

*Primary Examiner* — Khanh C Tran
(74) *Attorney, Agent, or Firm* — XSENSUS LLP (57) ABSTRACT

An accompanying matrix adjH(z, t) of a transfer function matrix H(z, t) established between a transmission station and a reception station is defined as a transmission weight WT(z). An M sequence part is divided into two blocks to obtain an M sequence first half part and an M sequence second half part. A training symbol #1 having the M sequence second half part and the M sequence first half part in that order and a training symbol #2 having the M sequence first half part and the M sequence second half part in that order are processed by the transmission weight WT(z). In the receiving station, a virtual training signal block having the M sequence part S and the M sequence first half part is generated. A communication path response R(m) is calculated by a slide correlation method for the virtual training signal block.

11 Claims, 8 Drawing Sheets

(56) References Cited

U.S. PATENT DOCUMENTS

2022/0294506 A1\* 9/2022 Kuriyama ............ H04B 7/0413
2023/0106272 A1\* 4/2023 Kuriyama ............ H04B 7/0456
                                              375/267

\* cited by examiner

COMMUNICATION PATH PRESUMING METHOD AND WIRELESS COMMUNICATION DEVICE

CROSS-REFERENCE TO RELATED APPLICATION

The present application is based on PCT filing PCT/JP2021/002670, filed Jan. 26, 2021, the entire contents of which are incorporated herein by reference.

TECHNICAL FIELD

The present disclosure relates to a technique for shortening a training symbol section for calculation of an equalization weight and improving the transmission capacity for a single-carrier (SC)-multiple input multiple output (MIMO) system using finite impulse response (FIR) transmission beam formation.

BACKGROUND ART

NPL 1 mentioned below discloses a technique for presuming a communication path in an SC-MIMO system using FIR transmission beam formation. More specifically, it discloses a method of presuming a communication path response with a channel impulse response (CIR) transfer function matrix set to H(z) when the number of transmitting/receiving antennas is set to N and the CIR length is set to L.

In the disclosed method, when the CIR transfer function matrix H(z) is regular, the inverse matrix $H(z)^{-1}$ is obtained by multiplying the inverse response $\det\{H(z)\}^{-1}$ of the determinant $\det\{H(z)\}$ by the adjoint matrix $\text{adj}\{H(z)\}$. In NPL 1, the inverse matrix $H(z)^{-1}$ of H(z) is split into the adjoint matrix $\text{adj}\{H(z)\}$ and the inverse response $\det\{H(z)\}^{-1}$, the former is used as a transmission weight $W_T(z)$, and the latter is used as a reception equalization weight $W_R(z)$.

When the adjoint matrix $\text{adj}\{H(z)\}$ is used as the transmission weight $W_T(z)$, $H(z)W_T(z)$ becomes a diagonal matrix having $\det\{H(z)\}$ as a diagonal element. Then, when $H(z)W_T(z)$ is made diagonal, an environment similar to one in which N single input-single output streams are formed is established between N transmitting antennas and N receiving antennas, and interference between streams is suppressed.

NPL 1 further discloses that when a reception signal is multiplied by $\det\{H(z)\}^{-1}$ as a reception equalization weight $W_R(Z)$, H(z) is made into a unit matrix to suppress inter-symbol interference. Thus, according to the method described in NPL 1, a MIMO system which does not require reception signals to be split can be constructed.

CITATION LIST

Non Patent Literature

[NPL 1] "Wide-Band Single-Carrier MIMO System Using FIR-type Transmit Beamforming and Bi-Directional Receive Equalization, Keita Kuriyama, Hayato Fukuzono, Masafumi Yoshioka, Tsutomu Tatsuta, 2019, The Institute of Electronics, Information and Communication Engineers General Conference, B-5-105, March 2019.

SUMMARY OF INVENTION

Technical Problem

The inverse response $\det\{H(z, t)\}^{-1}$ used as a reception equalization weight $W_R(z)$ can be obtained by calculation from the transfer function matrix H(z, t) presumed in the process of calculating the transmission weight $W_T(z)$. However, the environment between the transmitting antennas and the receiving antennas changes with time, for example, due to movement of a mobile object located between the transmitting antennas and the receiving antennas.

In order to avoid deterioration in accuracy caused by a change with time, it is desirable to execute the communication path presumption again in order to calculate the reception equalization weight $W_R(z)$. At that time, training signals transmitted from the transmitting antennas reach the receiving antennas via one or more indirect wave paths in addition to a direct wave path. Therefore, the signals arriving at the receiving antennas are affected by delay and attenuation caused by the multiple paths.

When a MIMO system is constructed, a communication path is presumed by assuming a delay wavelength caused by the multiple paths and using a training signal section in which the delay wavelength can be presumed. Further, as the training signal section becomes longer, the ability to cope with a longer delay wavelength is increased, but the transmission capacity of communication becomes smaller.

The present disclosure has been conceived in consideration of the above-described problems and has a first objective to provide a communication path presuming method for improving a transmission capacity of communication by shortening a training signal section while appropriately maintaining an upper limit of a delay wavelength that can be coped with.

In addition, a second objective of the present disclosure is to provide a wireless communication device that functions as a transmitting station for shortening a training signal section and thus improving a transmission capacity of communication while appropriately maintaining an upper limit of a delay wavelength that can be coped with.

In addition, a third objective of the present disclosure is to provide a wireless communication device that functions as a receiving station for shortening a training signal section and thus improving a transmission capacity of communication while appropriately maintaining an upper limit of a delay wavelength that can be coped with.

Solution to Problem

To achieve the above-described objectives, a first aspect of the present disclosure is a communication path presuming method for presuming a communication path between a transmitting station having a plurality of transmitting antennas and a receiving station having a plurality of receiving antennas in a MIMO system including the transmitting station and the receiving station, the method preferably including:

a transmission weight calculation step of calculating an adjoint matrix $\text{adj}H(z, t)$ of a transfer function matrix H(z, t) established between the transmitting station and the receiving station as a transmission weight $W_T(z)$;

a step of preparing N training symbols to each of which each of first to N-th blocks obtained by dividing a correlation sequence section composed of a known symbol group into N blocks is given into a second half part and a guard part is given into a first half part in order to guard against influence of a delay component of a preceding slot;

a step of sending each of N training signals beam-formed by multiplying each of the N training symbols by the transmission weight $W_T(z)$ together with the transfer function matrix H(z, t) from each of N transmitting antennas included in the plurality of transmitting antennas;

a step of extracting the block from each of the N training signals received by each of N receiving antennas included in the plurality of receiving antennas;

a step of generating a virtual training signal block composed of the correlation sequence section and a subsequent correlation sequence first half part by linking the extracted blocks;

a step of calculating a communication path response R(m) virtually realized between the transmitting station and the receiving station by using the transmission weight $W_T(z)$ by calculating a correlation between a comparison sequence section composed of the same symbol group as the correlation sequence section at each position while sliding the comparison sequence section with respect to the virtual training signal block; and a step of calculating a reception equalization weight $W_R(z)$ corresponding to an inverse response $\det\{H(z, t)\}^{-1}$ of a determinant $\det\{H(z, t)\}$ of the transfer function matrix H(z, t) based on the communication path response R(m).

In addition, a second aspect is a wireless communication device with a plurality of transmitting antennas constituting a MIMO system together with a receiving station having a plurality of receiving antennas, the wireless communication device including a transmission beam forming unit including a processor unit and a memory device, wherein the transmission beam forming unit preferably executes:

a process of acquiring an adjoint matrix adjH(z, t) of a transfer function matrix H(z, t) established between the wireless communication device and the receiving station as a transmission weight $W_T(z)$;

a process of preparing N training symbols to each of which each of first to N-th blocks obtained by dividing a correlation sequence section composed of a known symbol group into N blocks is given into a second half part and a guard part is given into a first half part in order to guard against influence of a delay component of a preceding slot;

a process of sending each of N training signals beam-formed by multiplying each of the N training symbols by the transmission weight $W_T(z)$ together with the transfer function matrix H(z, t) from each of N transmitting antennas included in the plurality of transmitting antennas; and a process of sending a data signal beam-formed by multiplying by the transmission weight $W_T(z)$ to the receiving station after the receiving station calculates a reception equalization weight $W_R(z)$ corresponding to an inverse response $\det\{H(z, t)\}^{-1}$ of a determinant $\det\{H(z, t)\}$ of the transfer function matrix H(z, t).

In addition, third aspect is a wireless communication device with a plurality of receiving antennas constituting a MIMO system together with a transmitting station having a plurality of transmitting antennas, the wireless communication device including an equalizer including a processor unit and a memory device, wherein the equalizer preferably performs a process of receiving N training signals sent from the N transmitting antennas beam-formed using a transmission weight $W_T(z)$ for eliminating interference between streams through each of N receiving antennas included in the plurality of receiving antennas, and each of the N training signals has each of first to N-th blocks obtained by dividing a correlation sequence section composed of a known symbol group into N blocks in a second half part, respectively, and has a guard part in a first half part in order to guard against influence of a delay component of a preceding slot, the equalizer further performing:

a process of extracting the block from each of the N training signals received via each of the N receiving antennas;

a process of generating a virtual training signal block composed of the correlation sequence section and a subsequent correlation sequence first half part by linking the extracted blocks;

a process of calculating a communication path response R(m) virtually realized between the transmitting station and the wireless communication device by using the transmission weight $W_T(z)$ by calculating a correlation between a comparison sequence section composed of the same symbol group as the correlation sequence section at each position while sliding the comparison sequence section with respect to the virtual training signal block; and a process of calculating a reception equalization weight $W_R(z)$ for demodulating a transmission signal from a reception signal based on the communication path response R(m).

Advantageous Effects of Disclosure

According to the first to third aspects, the transmission capacity of communication can be improved by shortening the training signal section while appropriately maintaining the upper limit of the delay wavelength that can be coped with.

DESCRIPTION OF EMBODIMENTS

First Embodiment

Configuration of First Embodiment

Figure 1:
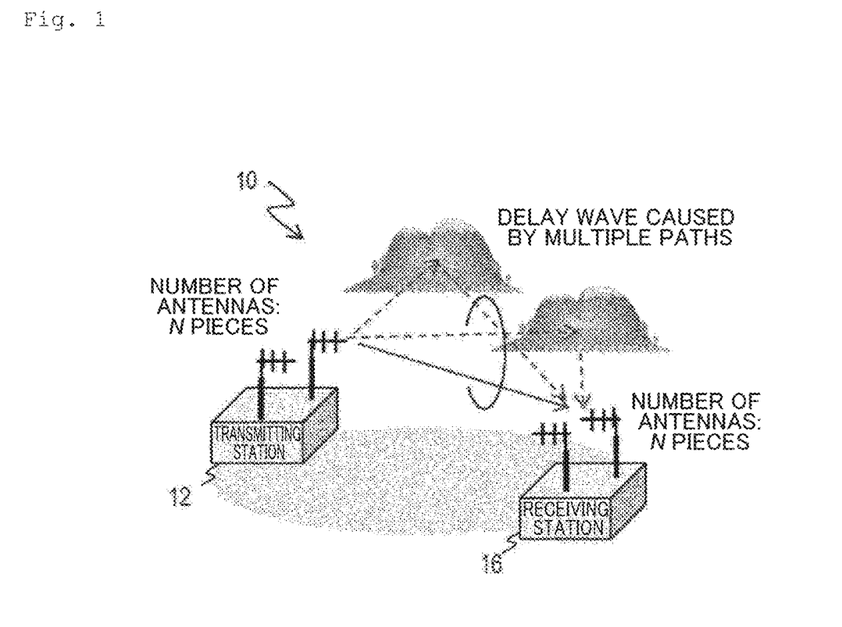
FIG. 1 is a diagram illustrating a model of a system according to a first embodiment of the present disclosure.

FIG. 1 is a diagram illustrating a model of a system according to a first embodiment of the present disclosure.

The communication system 10 according to the present embodiment includes a transmitting station 12 and a receiving station 16 as illustrated in FIG. 1. The transmitting station 12 and the receiving station 16 are arranged apart from each other, and each is provided with N antennas.

The transmitting station 12 and the receiving station 16 constitute a MIMO system, and can perform wireless communication by using the N antennas provided in each. Generally, multiple paths as shown in FIG. 1 are formed between the antennas provided in the transmitting station 12 and the antennas provided in the receiving station 16. In FIG. 1, the solid line arrow indicates a path for direct waves, and the broken line arrows indicate paths for reflected waves.

Figure 2:
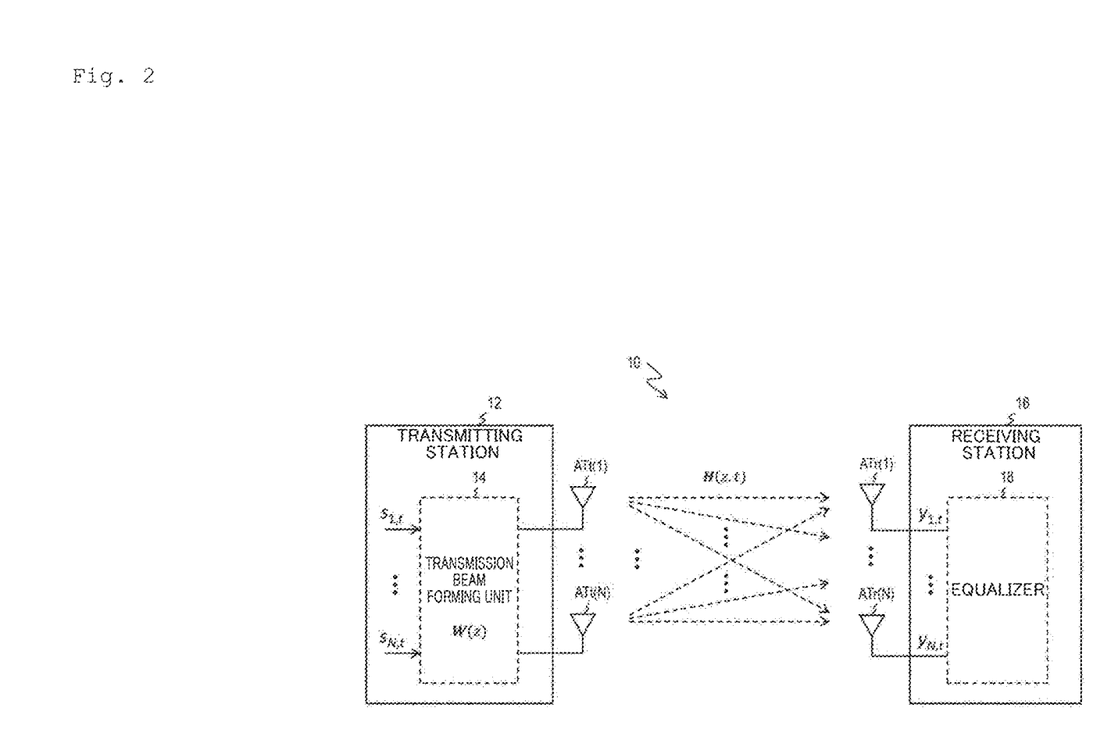
FIG. 2 is a block diagram of the system according to the first embodiment of the present disclosure.

FIG. 2 illustrates a block diagram of the communication system 10 illustrated in FIG. 1. The transmitting station 12 is provided with hardware including a general-purpose computer system. The hardware includes a processor unit such as a CPU and various memory devices. The transmitting station 12 realizes functions of the transmitting station 12 by the processor unit performing processing according to a program stored in such a memory device. The same applies to the receiving station 16.

The transmitting station 12 includes a transmission beam forming unit 14 as illustrated in FIG. 2. The transmission beam forming unit 14 is given N transmission signals $s_{1,t}$ to $s_{N,t}$ at a time t. Each of the transmission signals $s_{1,t}$ to $s_{N,t}$ is a signal corresponding to one of the N antennas ATt(1) to ATt(N). The transmission beam forming unit 14 can generate a transmission beam by multiplying the transmission signals $s_{1,t}$ to $s_{N,t}$ by a transmission weight $W_T(z)$.

The receiving station 16 is provided with an equalizer 18. The equalizer 18 is provided with reception signals $y_{1,t}$ to $y_{N,t}$ reaching each of the antennas ATr(1) to ATr(N) at a time t. The equalizer 18 multiplies the reception signals $y_{1,t}$ to $y_{N,t}$ by a reception equalization weight $W_R(z)$ to perform equalization processing for demodulating the transmission signals.

Processing Performed in First Embodiment

Figure 3:
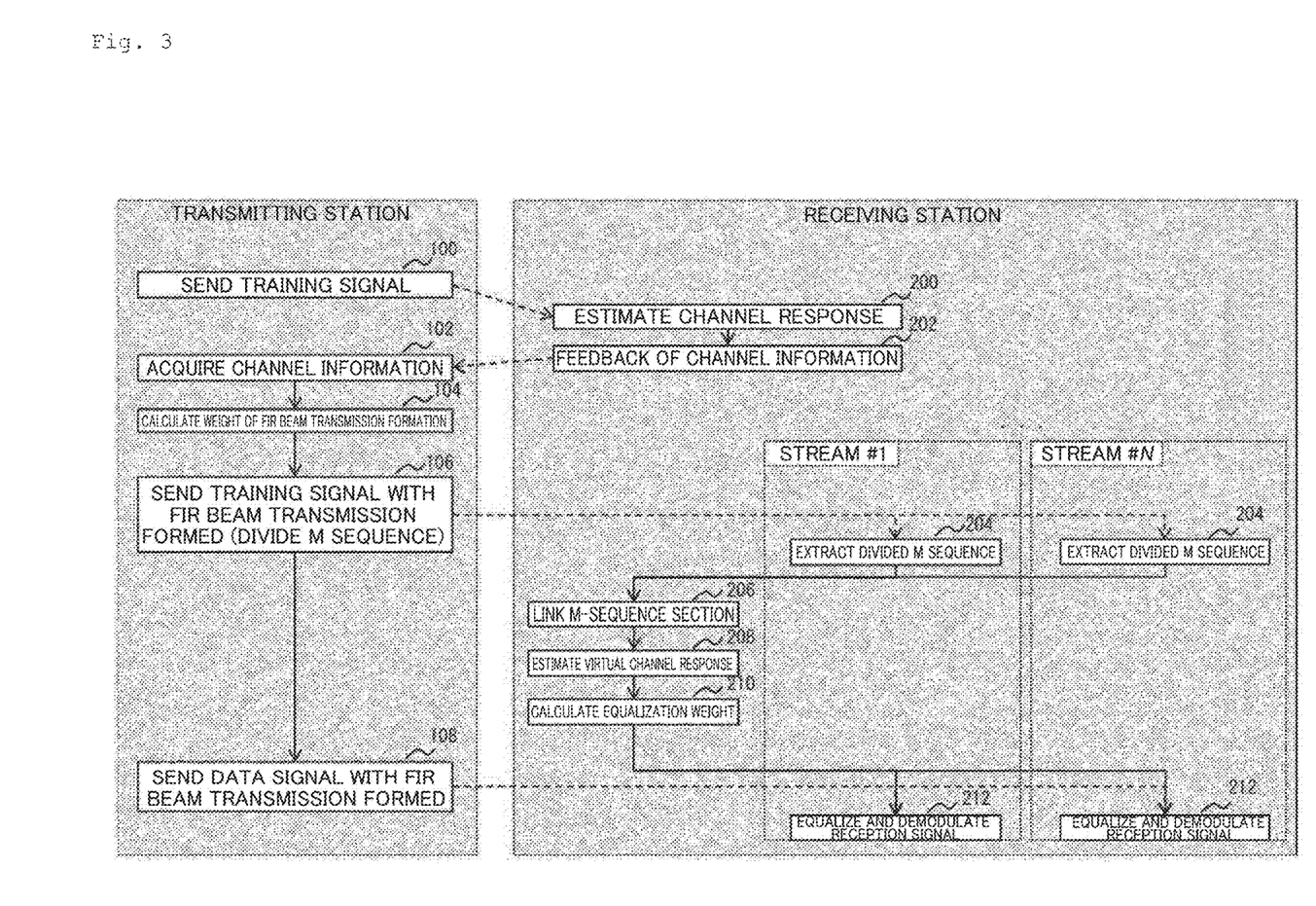
FIG. 3 is a flowchart for explaining the flow of processing executed by the system according to the first embodiment of the present disclosure.

FIG. 3 is a flowchart for explaining detailed processing executed by the transmitting station 12 and the receiving station 16 according to the present embodiment.

As shown in FIG. 3, in this embodiment, first, a training signal is sent from the transmitting station 12 to the receiving station 16 (step 100). The training signal transmitted in step 100 is a signal necessary for calculating a transmission weight $W_T(z)$.

When interference occurs between streams in transmission and reception of training signals, a communication path response between the transmitting antennas ATt(1) to ATt(N) and the receiving antennas ATr(1) to ATr(N) cannot be appropriately understood. For this reason, here, the training signals are sequentially sent from the transmitting antennas ATt(1) to ATt(N) to the receiving station 16.

The receiving station 16 which has received the training signals with each of the receiving antennas ATr(1) to ATr(N) presumes the communication path response based on these signals (step 200).

Figure 4:
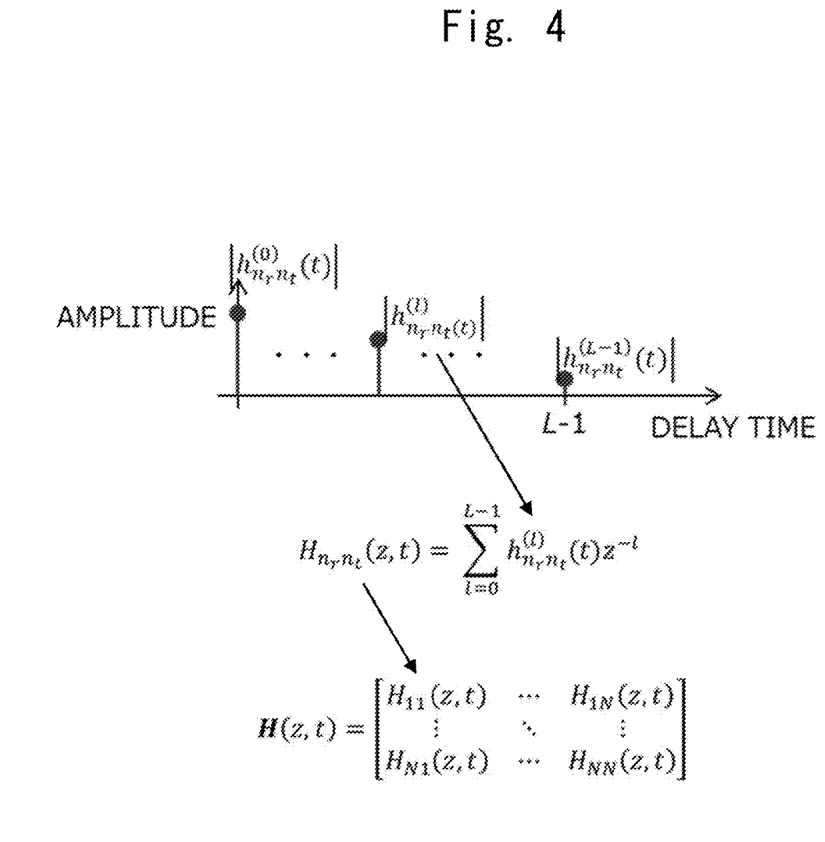
FIG. 4 is a diagram for explaining a transfer function matrix H(z, t) established between a transmitting station and a receiving station according to the first embodiment of the present disclosure.

FIG. 4 is a diagram for explaining the principle by which the receiving station 16 presumes the communication path response based on the training signals sent from the transmitting station 12.

The upper part of FIG. 4 shows the gain (amplitude) of the reception signal obtained by an $n_r$-th receiving antenna ATr($n_r$) due to the training signal sent from an $n_t$-th transmitting antenna ATt($n_t$) at the time t. In the figure, for example, (0) included in $|h^{(0)}{}_{n_r n_t}(t)|$ and $(L-1)$ included in $|h^{(L-1)}{}_{n_r n_t}(t)|$ each represent the order of delay. As described with reference to FIG. 1, the signal transmitted from the transmitting station 12 reaches the receiving station 16 via the multiple paths. At this time, the signal passing through the path of the reflected wave arrives with a delay and attenuation compared with the signal passing through the path of the direct wave. As a result, the receiving antenna ATr($n_r$) generally obtains an input as shown in the upper part of FIG. 4.

When an input shown in the upper part of FIG. 4 is obtained by the receiving antenna ATr($n_r$) with respect to the training signal sent from the transmitting antenna ATt($n_t$), the communication path response between these antennas can be expressed by the following equation as shown in the middle part of FIG. 4.

$$H_{n_r n_t}(z, t) = \sum_{l=0}^{L-1} h^{(t)}_{n_r n_t}(t) z^{-l} \qquad \text{[Math. 1]}$$

According to the processing of steps 100 and 200 described above, the above-mentioned $H_{n_r n_t}(z, t)$ can be obtained for all combinations of the N transmitting antennas ATt(1) to ATt(N) and the N receiving antennas ATr(1) to ATr(N). Then, the communication path response between the N transmitting and receiving antennas can be expressed by the following equation as shown in the lower part of FIG. 4 by using the results.

$$H(z, t) = \begin{bmatrix} H_{11}(z, t) & \cdots & H_{1N}(z, t) \\ \vdots & \ddots & \vdots \\ H_{N1}(z, t) & \cdots & H_{NN}(z, t) \end{bmatrix} \qquad \text{[Math. 2]}$$

Figure 5:
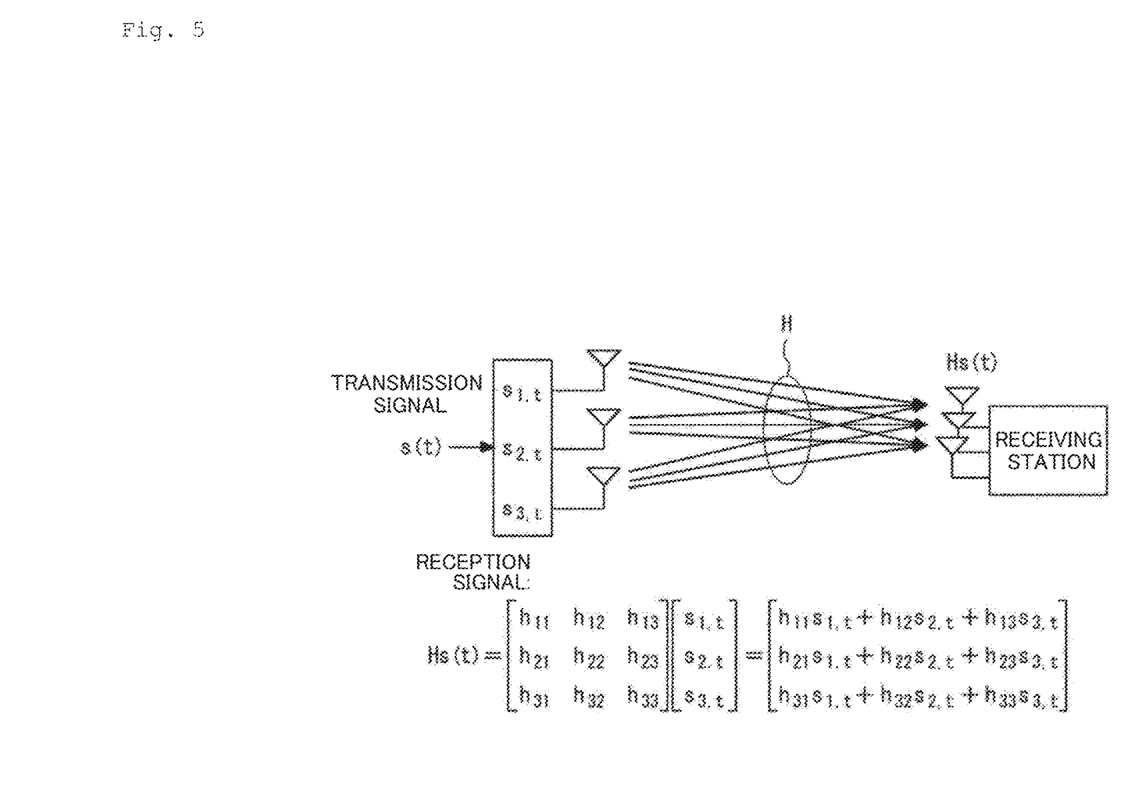
FIG. 5 is a diagram for explaining the relationship between a transmission signal s(t), a transfer function matrix H, and a reception signal Hs(t).

FIG. 5 shows a state in which signals $s_{1,t}$, $s_{2,t}$, and $s_{3,t}$ is transmitted from each of three transmitting antennas in 3×3 MIMO. In this case, the reception signal Hs(t) obtained by three receiving antennas can be represented as shown in the lower part of FIG. 5 by using each element of the transfer function matrix H(z, t) representing the presumed communication path response.

In this case, a reception signal in which the three transmission signals $s_{1,t}$, $s_{2,t}$, and $s_{3,t}$ are mixed reaches each of the receiving antennas. For this reason, in order to reproduce the transmission signals, it is necessary to perform separation processing of the reception signal.

With this regard, in order to eliminate the need for the separation processing in the present embodiment, the transmission signals are multiplied by the transfer function matrix H(z, t) and an appropriate transmission weight $W_T(z)$. The following shows the result of multiplication of the transfer function matrix H(z, t) and its adjoint matrix adj{H(z, t)}. However, for the sake of simplicity, here, each matrix is a 2×2 matrix.

$$H(z, t) adj\{H(z, t)\} = \begin{bmatrix} H_{11}(z, t) & H_{12}(z, t) \\ H_{21}(z, t) & H_{22}(z, t) \end{bmatrix} \qquad \text{[Math. 3]}$$
$$\begin{bmatrix} H_{22}(z, t) & -H_{12}(z, t) \\ -H_{21}(z, t) & H_{11}(z, t) \end{bmatrix}$$
$$= \begin{bmatrix} \det\{H(z, t)\} & 0 \\ 0 & \det\{H(z, t)\} \end{bmatrix}$$

det{H(z, t)} in the above equation is a determinant H(z, t), and specifically, it is represented by the following equation.

$$\det\{H(z,t)\}=H_{11}(z,t)H_{22}(z,t)-H_{12}(z,t)H_{21}(z,t)$$

When the transfer function matrix H(z, t) is multiplied by the adjoint matrix adj{H(z, t)} as shown by the above arithmetic expression, the result is a diagonal matrix having det{H(z, t)} as a diagonal element. Then, if the diagonal matrix is multiplied by the transmission signals, the signal reaching each of the receiving antennas is a signal including only a single transmission signal.

The following arithmetic expression represents reception signals $y_{1,t}$ to $y_{n,t}$ reaching each of the N receiving antennas ATr(1) to ATr(N) when the transmission beam forming unit 14 of the transmitting station 12 uses the adjoint matrix adj{H(z, t)} of the transfer function matrix Hz, t) as the transmission weight $W_T(z)$.

$$\begin{cases} y_{1,t} = \det\{H(z,t)\}s_{1,t} \\ \vdots \\ y_{N,t} = \det\{H(z,t)\}s_{N,t} \end{cases} \quad \text{[Math. 4]}$$

The arithmetic expression represents that only a single transmission signal is included in each of the reception signals $y_{1,t}$ to $y_{n,t}$ and that all streams indicate the same communication path response represented by det{H(z, t)}. In other words, it represents that N streams each having the characteristics of a single input and a single output and being able to be represented by the same communication path response are formed between the transmitting station 12 and the receiving station 16. In this case, although processing for setting the inverse response $\det\{H(z, t)\}^{-1}$ of the determinant det{H(z, t)} as the reception equalization weight $W_R(z)$ is required, separation processing of the reception signal can be made unnecessary.

The flowchart shown in FIG. 3 is referred to again. In this embodiment, in order to realize the above-mentioned function, the receiving station 16 feeds back communication path information to the transmitting station 12 after the end of step 200 (step 202). Here, specifically, the information of the transfer function matrix H(z, t) presumed in step 200 is fed back.

The transmitting station 12 receives the feedback and acquires the information of the transfer function matrix H(z, t) as the communication path information (step 102).

The transmitting station 12 then calculates an adjoint matrix adj{H(z, t)} of the transfer function matrix H(z, t) as the transmission weight $W_T(z)$ for FIR beam formation (step 104).

Next, the transmitting station 12 sends the FIR beam formed by using the transmission weight $W_T(z)$ as a training signal for calculating a reception equalization weight $W_R(z)$ (step 106). In the present embodiment, the inverse response $\det\{H(z, t)\}^{-1}$ of the determinant det{H(z, t)} of H(z, t) representing the communication path response is used as the reception equalization weight $W_R(z)$ as described above. Therefore, the reception equalization weight $W_R(z)$ can be obtained from H(z, t) obtained in the processing of step 200 by calculation. However, in order to avoid deterioration in accuracy due to a change with time occurring between the transmitting station 12 and the receiving station 16 in the present embodiment, the communication path presumption is performed again to calculate the reception equalization weight $W_R(z)$.

The FIR beam formed by multiplying by the transmission weight $W_T(z)$ can be handled as one that causes no interference between streams. For this reason, in this step 106, it is possible to simultaneously send up to N training signals from the N transmitting antennas ATt(1) to ATt(N). In the present embodiment, at least two training signals are simultaneously sent in this step 106.

Features of First Embodiment

Figure 6:
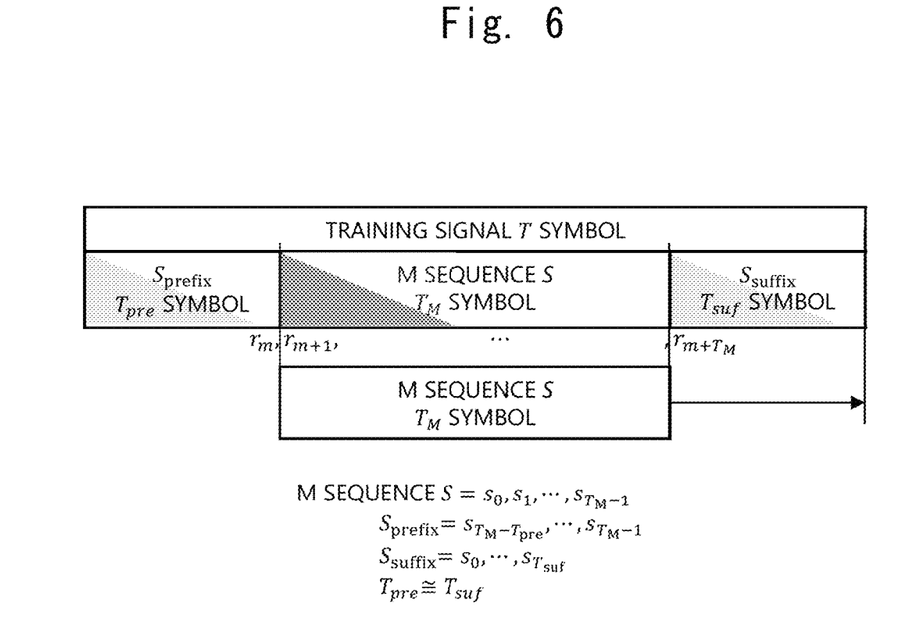
FIG. 6 is a diagram for explaining an example of a method of calculating a communication path response R(m) for reception equalization weight calculation.

FIG. 6 is a diagram for explaining the basic method of calculating a communication path response R(m) for calculation of the reception equalization weight $W_R(z)$. Here, the principle of calculating the communication path response R(m) for calculating the reception equalization weight $W_R(z)$ in a slide correlation method will be described.

The upper part of FIG. 6 shows an example of a training signal sent from one transmitting antenna when the slide correlation method is used. The training signal shown in FIG. 6 includes a prefix section Sprefix, an M sequence section S, and a suffix section Ssuffix.

The training signal includes T symbols (for example, 60 symbols). The M sequence section S is a correlation sequence of $T_M$ symbols (for example, 31 symbols), and has $s_0$ to $s_{TM-1}$ symbols (for example, $s_0$ to $s_{30}$). The prefix section Sprefix includes Tpre symbols (for example, 15 symbols including $s_{16}$ to $S_{30}$) in the latter half of the M sequence section S. In addition, the suffix section Ssuffix includes Tsuf symbols (for example, 14 symbols including $s_0$ to $S_{13}$) in the former half of the M sequence section S.

In the example shown in FIG. 6, the symbol name of $r_m$ (for example, $r_0$) is attached to the head of the M sequence section S of the training signal, and the symbol name of $r_{m+TM}$ (for example, $r_{31}$) is attached to the head of the suffix section Ssuffix. In addition, in the lower part of FIG. 6, an M sequence section S for comparison is shown in a manner that the M sequence section S of the training signal is aligned with the position of the head. The M sequence section S in the lower part of FIG. 6 also includes $s_0$ to $s_{TM-1}$ $T_M$ symbols, similarly to the M sequence section S of the training signal.

In the training signal in the upper part of FIG. 6, down-sloping triangles are drawn in each of the prefix section Sprefix, the M sequence section S, and the suffix section Ssuffix. Since the training signal shown in FIG. 6 reaches the receiving station 16 via the multiple paths, it reaches the receiving station 16 with delay and attenuation in the same manner as the signal shown in the upper part of FIG. 4. The triangle drawn in the prefix section Sprefix indicates delay and attenuation appearing in the head symbol of the prefix section Sprefix. The same applies to the triangle drawn in the M sequence section S and the suffix section Ssuffix. In addition, all of the symbols included in the training signal in the upper part of FIG. 6 reach the receiving station 16 with delay and attenuation likewise.

The gain of each symbol included in the training signal is largest when the delay is zero. Therefore, the correlation between the M sequence section S of the upper part and the M sequence section S of the lower part is highest when the head of the M sequence section S of the lower part matches the head of the M sequence section of the upper part, that is, when it has the positional relationship shown in FIG. 6. When the M sequence section S of the lower part is slid backward by one symbol, it is compared with the M sequence section S attenuated by one symbol, and thus the correlation becomes lower by that amount. Thereafter, the correlation between both sections becomes lower as the M sequence section S of the lower part slides backward in the same manner.

In the slide correlation method, the correlation of both sections is calculated while sliding the M sequence section S of the lower part until the end of the M sequence section S of the lower part matches the end of the suffix section Ssuffix of the upper part, with the state in which the head of the M sequence section S of the lower part matches the head of the M sequence section S of the upper part as a starting point. The correlation at each position in the course of slide is calculated using the following equation.

$$R(m) = \frac{1}{T_M} \sum_{p=0}^{T_{M-1}} s_p r^*_{p+m} \quad \begin{array}{l} r\text{: reception signal sequence} \\ *\text{: complex conjugate} \end{array} \quad \text{[Math. 5]}$$

When calculating the correlation by sliding the M sequence section S of the lower part, it is desirable that all symbols $s_0$ to $s_{TM-1}$ of the M sequence section S are arranged in an area overlapping the M sequence section S of the lower part in the training signal of the upper part. Therefore, in the training signal shown in FIG. 6, the suffix section Ssuffix including the symbols in the first half symbol of the M sequence section S continues following the M sequence section S.

On the other hand, the vicinity of the head of the training signal, that is, the prefix section Sprefix, may be affected by the delay component of the preceding slot of the signal. For this reason, in the present embodiment, the prefix section Sprefix is excluded from the comparison target for calculating the correlation, and the communication path response R(m) is presumed with symbols from the head of the M sequence section S. However, it is necessary to include the prefix section Sprefix in the training signal in order to create a guard area between the signal and the preceding slot.

Figure 7:
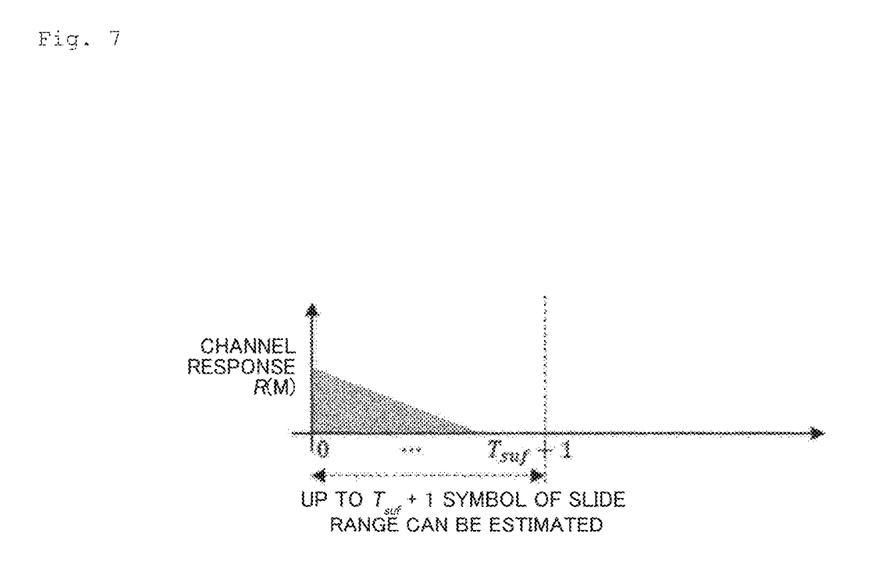
FIG. 7 is a diagram illustrating an example of a communication path response R(m) obtained using the slide correlation method shown in FIG. 6.

FIG. 7 shows a communication path response obtained by plotting the result of the correlation R(m) calculated using the above-mentioned method based on the relationship with the slide amount. The communication path response shown in FIG. 7 correctly represents the state of the multiple paths between one transmitting antenna which has emitted the training signal and one receiving antenna which has received the signal, as in the case of the communication path response $Hn_t n_r$ (z, t) expressed in [Math. 1].

In an environment in which a transmission beam obtained by multiplying by the transmission weight $W_T(z)$ is sent, all streams have the same communication path response as described above. In this case, the transfer function matrix virtually established between the transmitting station 12 and the receiving station 16 is a diagonal matrix having R(m) as a diagonal element. Then, when the inverse response det{H (z, t)}$^{-1}$ is obtained based on the R(m), an appropriate reception equalization weight $W_R(z)$ can be obtained.

The above-mentioned sliding can be repeated until the end $s_{TM-1}$ of the M sequence section S in the lower part of FIG. 6 matches the end $r_{m+TM+Tsuf}$ of the suffix section Ssuffix in the upper part. Therefore, the upper limit of the slide range is Tsuf+1 as shown in FIG. 7 (for example, 16).

For the reasons described above, the training signal shown in FIG. 6 is constructed with the prefix section Sprefix and the suffix section Ssuffix before and after the M sequence section S. As a result, when the signal shown in FIG. 6 is used, a training signal section of Tpre+TM+Tsuf (for example, 60 symbols) is required.

The transmission capacity between the transmitting station 12 and the receiving station 16 decreases as the training signal section becomes longer. Therefore, in order to secure the transmission capacity, it is desirable that the training signal section be short.

Incidentally, in the stage of calculating the reception equalization weight $W_R(z)$, the transmission signal is multiplied by the transmission weight $W_T(z)$ so that interference between streams is avoided and the same virtual communication path response is obtained in all streams. For this reason, the symbols necessary for calculating the reception equalization weight $W_R(z)$ can be divided into a plurality of streams and transmitted at the same time, and the receiving station 16 can link the streams. According to such a method, the lengths of the signals to be transmitted on each stream become shorter, and the training signal section is shortened.

Figure 8:
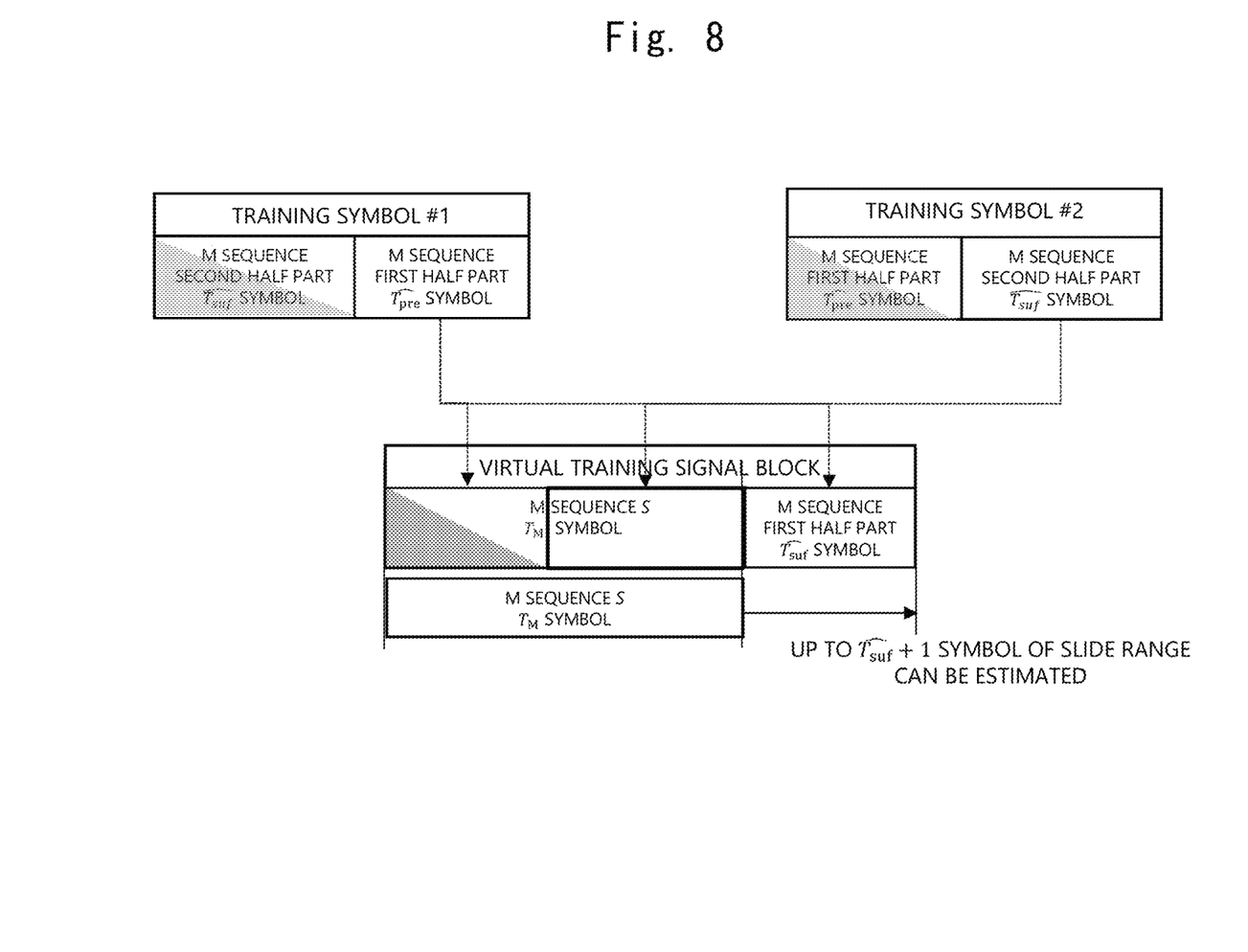
FIG. 8 is a diagram for explaining a characteristic method used to calculate a communication path response R(m) according to the first embodiment of the present disclosure.

FIG. 8 is a diagram for explaining a configuration of a training symbol used in the present embodiment based on the above-mentioned viewpoint. More specifically, FIG. 8 shows an example of a configuration of a training symbol for calculating the reception equalization weight $W_R(z)$ used in the present embodiment when the communication system 10 is a 2×2 MIMO system.

In FIG. 8, the signal shown on the left side in the upper part indicates a training symbol #1 to be transferred in a first stream formed between a first transmitting antenna ATt(1) and a first receiving antenna ATr(1). The training symbol #1 is composed of an "M sequence second half part" of $\widehat{Tsuf}$ symbols (for example, 16 symbols) and the subsequent "M sequence first half part" of $\widehat{Tpre}$ symbols (for example, 15 symbols).

The signal shown on the right side in the upper part of FIG. 8 indicates a training symbol #2 to be transferred in a second stream formed between a second transmitting antenna ATt(2) and a second receiving antenna ATr(2). The training symbol #2 is composed of an "M sequence first half part" of $\widehat{Tpre}$ symbols (for example, 15 symbols) and the subsequent "M sequence second half part" of $\widehat{Tsuf}$ (for example, 16 symbols).

Further, $\widehat{Tsuf}$ and $\widehat{Tpre}$ are values determined as integers satisfying the following two conditions.

$$\widehat{Tsuf} + \widehat{Tpre} = T_M \quad \text{(Condition 1)}$$

$T_M$ is a value determined as the number of symbols necessary for presuming the communication path response, and is the same number as the value shown in FIG. 6 (for example, 31).

$$\widehat{Tsuf} \approx \widehat{Tpre} \quad \text{(Condition 2)}$$

When $T_M$ is an even number, $\widehat{Tsuf} = \widehat{Tpre} = T_M/2$ is satisfied. When $T_M$ is an odd number, the value obtained by rounding up the decimal point of $T_M/2$ is set for one of $\widehat{Tsuf}$ or $\widehat{Tpre}$, and the value obtained by rounding down it is set for the other.

The lower part of FIG. 8 shows a virtual training signal block to be subjected to a slide correlation in the present embodiment and an M sequence section S used for comparison. The virtual training signal block has a configuration in which the "M sequence first half part" located in the second half of the training symbol #1, the "M sequence second half part" located in the second half of the training symbol #2, and the "M sequence first half part" located in the second half of the training symbol #1 are linked in series.

The "M sequence second half part" located in the first half of the training symbol #1 may be affected by the delay component of the preceding slot, similarly to the prefix section Sprefix shown in FIG. 6. The same applies to the "M sequence first half part" located in the first half of the training symbol #2. On the other hand, the portion incorporated in the virtual training signal block is not affected by the delay component of the preceding slot.

For this reason, the virtual training signal block is configured to includes all of the "M sequence section S" which is not affected by the preceding slot and the "suffix section Ssuffix" which is not affected by the preceding slot. That is, the virtual training signal block has exactly the same structure as the portion to be subjected to a slide correlation in the training signal shown in the upper part of FIG. 6.

In this embodiment, calculation of the communication path response R(m) is repeated until the end of the M sequence section S for comparison matches the end of the virtual training signal block, starting from the state in which the head of the M sequence section S for comparison matches the head of the virtual training signal block. Thus, it is possible to secure the slide range described above $\text{Tsuf}^\frown +1$ (for example, 16 symbols) in the same manner as in the case in which the training signals #1 and #2 shown in FIG. 6 are used.

All of the training symbols #1 and #2 shown in the upper part of FIG. 8 are constituted by the number of symbols of $\text{Tsuf}^\frown + \text{Tpre}^\frown = T_M$ (for example, 31 symbols). In addition, the training symbols #1 and #2 can be simultaneously transmitted as described above. Thus, according to the method of the present embodiment, the training signal section can be shortened from Tpre+$T_M$+Tsuf (for example, 60 symbols) to $T_M$ (for example, 31 symbols) compared to when the training signal shown in FIG. 6 is used. Since the training signal shown in FIG. 6 is configured such that Tpre+Tsuf is approximately $T_M$, this reduction is equivalent to approximately ½.

Referring again to the flowchart shown in FIG. 3, the processing of the transmitting station 12 and the receiving station 16 will be described.

In step 106 shown in FIG. 3, at least two training signals are sent from the transmitting station 12 to the receiving station 16. When the system of the present embodiment is a 2×2 MIMO system, these training signals are generated in the following procedure.

(Step 106-1) The M sequence section is divided into a first half part including a $\text{Tpre}^\frown$ symbol and a second half part including a $\text{Tsuf}^\frown$ symbol.

(Step 106-2) A training symbol #1 in which the "M sequence first half part" including the $\text{Tpre}^\frown$ symbol is disposed after the "M sequence second half part" including the $\text{Tsuf}^\frown$ symbol is configured.

(Step 106-3) A training symbol #2 in which the "M sequence second half part" including the $\text{Tsuf}^\frown$ symbol is disposed after the "M sequence first half part" including the $\text{Tpre}^\frown$ symbol is configured.

It should be noted that, in a 3×3 or greater MIMO system, the M sequence section may be divided into three or more portions instead of two portions, and transmitted simultaneously on three or more streams.

When the training signals are received, the receiving station 16 extracts blocks of the divided M sequence sections from the signals arriving at each of the receiving antennas (step 204). Specifically, here, the "M sequence first half part" or "M sequence second half part" disposed in the second half of the signals is extracted from each of the reception signals.

Next, the receiving station 16 links the extracted blocks to form a virtual training signal block (step 206). Specifically, here, the blocks extracted in step 204 are used to form a virtual training signal block having a structure of the "M sequence first half part", "M sequence second half part", and "M sequence first half part".

Next, the virtual training signal block obtained in step 206 is used as a target of comparison to calculate a communication path response R(m) using a slide correlation method (step 208).

Furthermore, a reception equalization weight $W_R(z)$ is calculated based on the communication path response R(m) calculated in the above processing (refer to FIG. 7) (step 210).

With the above processing, the training processing of the transmitting station 12 and the receiving station 16 is completed. Thereafter, the transmitting station 12 sends a data signal in which an FIR beam has been formed with a transmission weight $W_T(z)$ (step 108). Furthermore, the receiving station 16 demodulates the transmission data by equalizing the reception signals with the reception equalization weight $W_R(z)$ (step 212). Thus, communication by an N×N MIMO system is established.

Modified Example of First Embodiment

In the above-described embodiment 1, although the M sequence is used for the training signal for calculating the reception equalization weight $W_R(z)$, the present disclosure is not limited to this. Instead of the M sequence, another sequence generally used for presuming a communication path response may be used.

In addition, the first embodiment described above does not include the processing of notifying the transmitting station 12 that the receiving station 16 has completed the calculation of the reception equalization weight $W_R(z)$. However, the receiving station 16 may notify the transmitting station 12 of the completion of the calculation of the $W_R(z)$, and the transmitting station 12 may wait for the notification and start the processing of step 108, that is, transmission of a data signal.

Furthermore, although the transmitting station 12 and the receiving station 16 are assumed to be base stations for wireless communication in the above-described first embodiment, the present disclosure is not limited to this. The transmitting station 12 and the receiving station 16 in the present disclosure may be realized by user terminals.

Furthermore, although the transmission weight $W_T(z)$ is calculated by the transmitting station 12 in the above-described first embodiment, the present disclosure is not limited to this. The transmission weight $W_T(z)$ may be calculated by the receiving station 16, and the result may be fed back to the transmitting station 12 by the receiving station 16.

Further, the M sequence section is divided into two parts including the "M sequence first half part" and the "M sequence second half part" and transmitted in the above-described first embodiment. However, the number of divisions of the M sequence section is not limited to two. For example, in a case in which N streams are present in an N×N MIMO system, the M sequence may be divided into N blocks and transmitted as N training symbols #1 to #N. In this case, a symbol equivalent to $\text{Tsuf}^\frown$ or $\text{Tpre}^\frown$ may be arranged as a guard part for absorbing the influence of the preceding slot in the front of each of the training symbols #1 to #N so that the training signal section can be shortened to Tsuf⌒ (or Tpre⌒)+T_M/N.

Further, in the above-described first embodiment, the M sequence section S shown on the upper side of the lower part of FIG. 8 corresponds to the "correlation sequence section" described in claim 1, and the M sequence section shown on the lower side of the lower part of FIG. 8 corresponds to the "comparison sequence section" described in claim 1. Furthermore, the M sequence second half part on the left side and the M sequence first half part on the right side of the upper part of FIG. 8 correspond to the guard part in claim 1, and the M sequence first half part and the M sequence second half part correspond to the "correlation sequence first half part" and the "correlation sequence second half part" in claim 1, respectively.

In addition, in the above-described first embodiment, the transmitting station 12 corresponds to the "wireless communication device" described in claims 5 and 6, and the receiving station 16 corresponds to the "wireless communication device" described in claims 7 and 8.

REFERENCE SIGNS LIST

10 Communication system
12 Transmitting station
16 Receiving station
ATt(1) to ATt(N) Transmitting antenna
ATr(1) to ATr(N) Receiving antenna
$Hn_t n_r(z, t)$ Communication path response between transmitting antenna $ATt(n_t)$ and receiving antenna $ATr(n_r)$
$H(z, t)$ Transfer function matrix between transmitting station and receiving station
$adj\{H(z, t)\}$ Adjoint matrix of $H(z, t)$
$det\{H(z, t)\}$ Determinant of $H(z, t)$
$det\{H(z, t)\}^{-1}$ Inverse response of $det\{H(z, t)\}$
$W_T(z)$ Transmission weight
$W_R(z)$ Reception equalization weight
$R(m)$ Communication path response calculated by using slide correlation method
$T_M$ The number of symbols of M sequence section
Tpre⌒ The number of symbols of M sequence first half part
Tsuf⌒ The number of symbols of M sequence second half part

The invention claimed is:

1. A communication path presuming method for presuming a communication path between a transmitting station having a plurality of transmitting antennas and a receiving station having a plurality of receiving antennas in a MIMO system including the transmitting station and the receiving station, the communication path presuming method comprising:
a transmission weight calculation for calculating an adjoint matrix adjH(z,t) of a transfer function matrix H(z,t) established between the transmitting station and the receiving station as a transmission weight $W_T(z)$;
preparing N training symbols to each of which each of first to N-th blocks obtained by dividing a correlation sequence section composed of a known symbol group into N blocks is given into a second half part and a guard part is given into a first half part in order to guard against influence of a delay component of a preceding slot;
sending each of N training signals beam-formed by multiplying each of the N training symbols by the transmission weight $W_T(z)$ together with the transfer function matrix H(z,t) from each of N transmitting antennas included in the plurality of transmitting antennas;
extracting the block from each of the N training signals received by each of N receiving antennas included in the plurality of receiving antennas;
generating a virtual training signal block composed of the correlation sequence section and a subsequent correlation sequence first half part by linking the extracted blocks;
calculating a communication path response R(m) virtually realized between the transmitting station and the receiving station by using the transmission weight $W_T(z)$ by calculating a correlation between a comparison sequence section composed of the same symbol group as the correlation sequence section at each position while sliding the comparison sequence section with respect to the virtual training signal block; and
calculating a reception equalization weight $W_R(z)$ corresponding to an inverse response $det\{H(z,t)\}^{-1}$ of a determinant $det\{H(z,t)\}$ of the transfer function matrix H(z,t) based on the communication path response R(m).

2. The communication path presuming method according to claim 1, wherein
the N is 2,
the N blocks are a correlation sequence first half part that is the first half part of the correlation sequence section and a correlation sequence second half part that is the second half part of the correlation sequence section,
the N training symbols are composed of a first training symbol in which the correlation sequence second half part and the correlation sequence first half part are linked in series in that order, and a second training symbol in which the correlation sequence first half part and the correlation sequence second half part are linked in series in that order,
the guard part of the first training symbol is the correlation sequence second half part,
the guard part of the second training symbol is the correlation sequence first half part, and
the virtual training signal block has a configuration in which the correlation sequence first half part included in the first training symbol, the correlation sequence second half part included in the second training symbol, and the correlation sequence first half part included in the first training symbol are linked in series in that order.

3. The communication path presuming method according to claim 2, wherein
the transmission weight calculation includes:
sending, by the transmitting station, a training signal for transmission weight calculation sequentially from each of the plurality of transmitting antennas,
presuming, by the receiving station, a communication path response Hnrnt(z, t) established between each of the plurality of transmitting antennas and each of the plurality of receiving antennas based on the training signal for transmission weight calculation received with each of the plurality of receiving antennas, and
setting the transfer function matrix H(z,t) based on the communication path responses Hnrnt(z, t).

4. The communication path presuming method according to claim 2, comprising:
sending, by the transmitting station, a data signal beam-formed by multiplying by the transmission weight WT(z) to the receiving station after the calculation of the reception equalization weight WR(z); and
demodulating, by the receiving station, the beam-formed data signal into transmission data by processing with the reception equalization weight WR(z).

5. The communication path presuming method according to claim 1, wherein
the transmission weight calculation includes:
sending, by the transmitting station, a training signal for transmission weight calculation sequentially from each of the plurality of transmitting antennas,
presuming, by the receiving station, a communication path response $H_{n_t n_r}(z, t)$ established between each of the plurality of transmitting antennas and each of the plurality of receiving antennas based on the training signal for transmission weight calculation received with each of the plurality of receiving antennas, and
setting the transfer function matrix H(z,t) based on the communication path responses $H_{n_t n_r}(z, t)$.

6. The communication path presuming method according to claim 5, comprising:
sending, by the transmitting station, a data signal beam-formed by multiplying by the transmission weight WT(z) to the receiving station after the calculation of the reception equalization weight WR(z); and
demodulating, by the receiving station, the beam-formed data signal into transmission data by processing with the reception equalization weight WR(z).

7. The communication path presuming method according to claim 1, comprising:
sending, by the transmitting station, a data signal beam-formed by multiplying by the transmission weight $W_T(z)$ to the receiving station after the calculation of the reception equalization weight $W_R(z)$; and
demodulating, by the receiving station, the beam-formed data signal into transmission data by processing with the reception equalization weight $W_R(z)$.

8. A wireless communication device with a plurality of transmitting antennas constituting a MIMO system together with a receiving station having a plurality of receiving antennas, the wireless communication device comprising:
transmission beam forming circuitry including a processor and a memory, wherein
the transmission beam forming circuitry is configured to execute:
a process of acquiring an adjoint matrix adjH(z,t) of a transfer function matrix H(z,t) established between the wireless communication device and the receiving station as a transmission weight $W_T(z)$;
a process of preparing N training symbols to each of which each of first to N-th blocks obtained by dividing a correlation sequence section composed of a known symbol group into N blocks is given into a second half part and a guard part is given into a first half part in order to guard against influence of a delay component of a preceding slot;
a process of sending each of N training signals beam-formed by multiplying each of the N training symbols by the transmission weight $W_T(z)$ together with the transfer function matrix H(z,t) from each of N transmitting antennas included in the plurality of transmitting antennas; and a process of sending a data signal beam-formed by multiplying by the transmission weight $W_T(z)$ to the receiving station after the receiving station calculates a reception equalization weight $W_R(z)$ corresponding to an inverse response $det\{H(z,t)\}^{-1}$ of a determinant $det\{H(z,t)\}$ of the transfer function matrix H(z,t).

9. The wireless communication device according to claim 8, wherein
the N is 2,
the N blocks are a correlation sequence first half part that is the first half part of the correlation sequence section and a correlation sequence second half part that is the second half part of the correlation sequence section,
the N training symbols are composed of a first training symbol in which the correlation sequence second half part and the correlation sequence first half part are linked in series in that order, and a second training symbol in which the correlation sequence first half part and the correlation sequence second half part are linked in series in that order,
the guard part of the first training symbol is the correlation sequence second half part, and
the guard part of the second training symbol is the correlation sequence first half part.

10. A wireless communication device with a plurality of receiving antennas constituting a MIMO system together with a transmitting station having a plurality of transmitting antennas, the wireless communication device comprising:
an equalizer including a processor and a memory, wherein
the equalizer is configured to perform:
a process of receiving N training signals sent from the N transmitting antennas beam-formed using a transmission weight $W_T(z)$ for eliminating interference between streams through each of N receiving antennas included in the plurality of receiving antennas, and
each of the N training signals has each of first to N-th blocks obtained by dividing a correlation sequence section composed of a known symbol group into N blocks in a second half part, respectively, and has a guard part in a first half part in order to guard against influence of a delay component of a preceding slot,
the equalizer is configured to further perform:
a process of extracting the block from each of the N training signals received via each of the N receiving antennas;
a process of generating a virtual training signal block composed of the correlation sequence section and a subsequent correlation sequence first half part by linking the extracted blocks;
a process of calculating a communication path response R(m) virtually realized between the transmitting station and the wireless communication device by using the transmission weight $W_T(z)$ by calculating a correlation between a comparison sequence section composed of the same symbol group as the correlation sequence section at each position while sliding the comparison sequence section with respect to the virtual training signal block; and
a process of calculating a reception equalization weight $W_R(z)$ for demodulating a transmission signal from a reception signal based on the communication path response R(m).

11. The wireless communication device according to claim 10, wherein the N is 2, the N blocks are a correlation sequence first half part that is the first half part of the correlation sequence section and a correlation sequence second half part that is the second half part of the correlation sequence section, the N training symbols are composed of a first training signal in which the correlation sequence second half part and the correlation sequence first half part are linked in series in that order, and a second training signal in which the correlation sequence first half part and the correlation sequence second half part are linked in series in that order, the guard part of the first training signal is the correlation sequence second half part, and the guard part of the second training signal is the correlation sequence first half part.

\* \* \* \* \*